US012757121B2

(12) United States Patent
Beaudin et al.

(10) Patent No.: US 12,757,121 B2
(45) Date of Patent: Oct. 6, 2026

(54) NETWORK POWER CONSUMPTION ALLOCATION BASED ON POWER CONSUMPTION CREDITS

(71) Applicant: HEWLETT PACKARD ENTERPRISE DEVELOPMENT LP, Spring, TX (US)

(72) Inventors: Andre Beaudin, St. Laurent (CA); Qiang Zhou, Santa Clara, CA (US); Shubham Saloni, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 691 days.

(21) Appl. No.: 18/183,422

(22) Filed: Mar. 14, 2023

(65) Prior Publication Data

US 2024/0314695 A1 Sep. 19, 2024

(51) Int. Cl.
*H04W 52/02* (2009.01)

(52) U.S. Cl.
CPC ... *H04W 52/0258* (2013.01); *H04W 52/0219* (2013.01)

(58) Field of Classification Search
CPC ......... H04W 52/0258; H04W 52/0219; H04W 52/0203; H04W 84/12
See application file for complete search history.

(56) References Cited

U.S. PATENT DOCUMENTS 8,019,634 B2 9/2011 Wegner et al.
9,477,279 B1 * 10/2016 Piszczek ................. G06F 1/206
10,452,436 B2 10/2019 Kumar et al.
2009/0063228 A1 3/2009 Forbes, Jr.
2010/0235008 A1 9/2010 Forbes, Jr. et al.
2011/0276194 A1 11/2011 Emalfarb et al.
2012/0284096 A1 11/2012 Gomes et al.
2013/0275781 A1 * 10/2013 Ramage ................ G06F 1/3275 713/300

(Continued)

FOREIGN PATENT DOCUMENTS

WO 2020/198409 A1 10/2020

OTHER PUBLICATIONS

Banerji et al., "On IEEE 802.11: Wireless LAN Technology", International Journal of Mobile Network Communications & Telematics (IJMNCT), vol. 3, Issue. 4, 2013, 20 pages.

*Primary Examiner* — Hoang-Chuong Q Vu
(74) *Attorney, Agent, or Firm* — Sheppard Mullin Richter & Hampton LLP

(57) ABSTRACT

Systems and methods are provided for dynamic power allocation across a network deployment through a power consumption credits system that can balance a power budget throughout the network deployment by allocating credits to high power consuming network devices and generating credits by low-power consumption network devices. An example of the systems and methods associate a credit pool with a network deployment and map a number of credits to the credit pool based on a power budget. Credits can be allocated from the credit pool to network devices on the network deployment and/or accumulated into the credit pool from the network devices based on power consumption requirements of the network devices relative to a baseline.

15 Claims, 4 Drawing Sheets

(56) References Cited

U.S. PATENT DOCUMENTS

| | | | | |
|---|---|---|---|---|
| 2013/0288686 | A1* | 10/2013 | Chou | H04N 21/64322 455/574 |
| 2013/0332327 | A1 | 12/2013 | Sgouridis et al. | |
| 2014/0155148 | A1 | 6/2014 | Wrightsil et al. | |
| 2014/0189157 | A1* | 7/2014 | DeCusatis | H04L 45/12 709/238 |
| 2015/0046238 | A1 | 2/2015 | Di Franco et al. | |
| 2019/0075166 | A1* | 3/2019 | Gandhi | H04L 41/0853 |
| 2021/0349512 | A1* | 11/2021 | Guim Bernat | G06F 1/26 |
| 2022/0026972 | A1* | 1/2022 | Shah | G06F 1/324 |
| 2022/0317640 | A1* | 10/2022 | Krishnamurthy | G05B 19/042 |

* cited by examiner

NETWORK POWER CONSUMPTION ALLOCATION BASED ON POWER CONSUMPTION CREDITS

BACKGROUND

Wireless local area networks (WLAN) networks are becoming ubiquitous in enterprises, providing secure and cost-effective access to resources. Those networks usually have one or more controllers, each controller supporting a plurality of network devices deployed through the enterprise. WiFi networks operating in accordance with IEEE 802.11 standards are examples of such networks.

What is needed is a way of dynamically allocate power in modern WLAN deployments.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
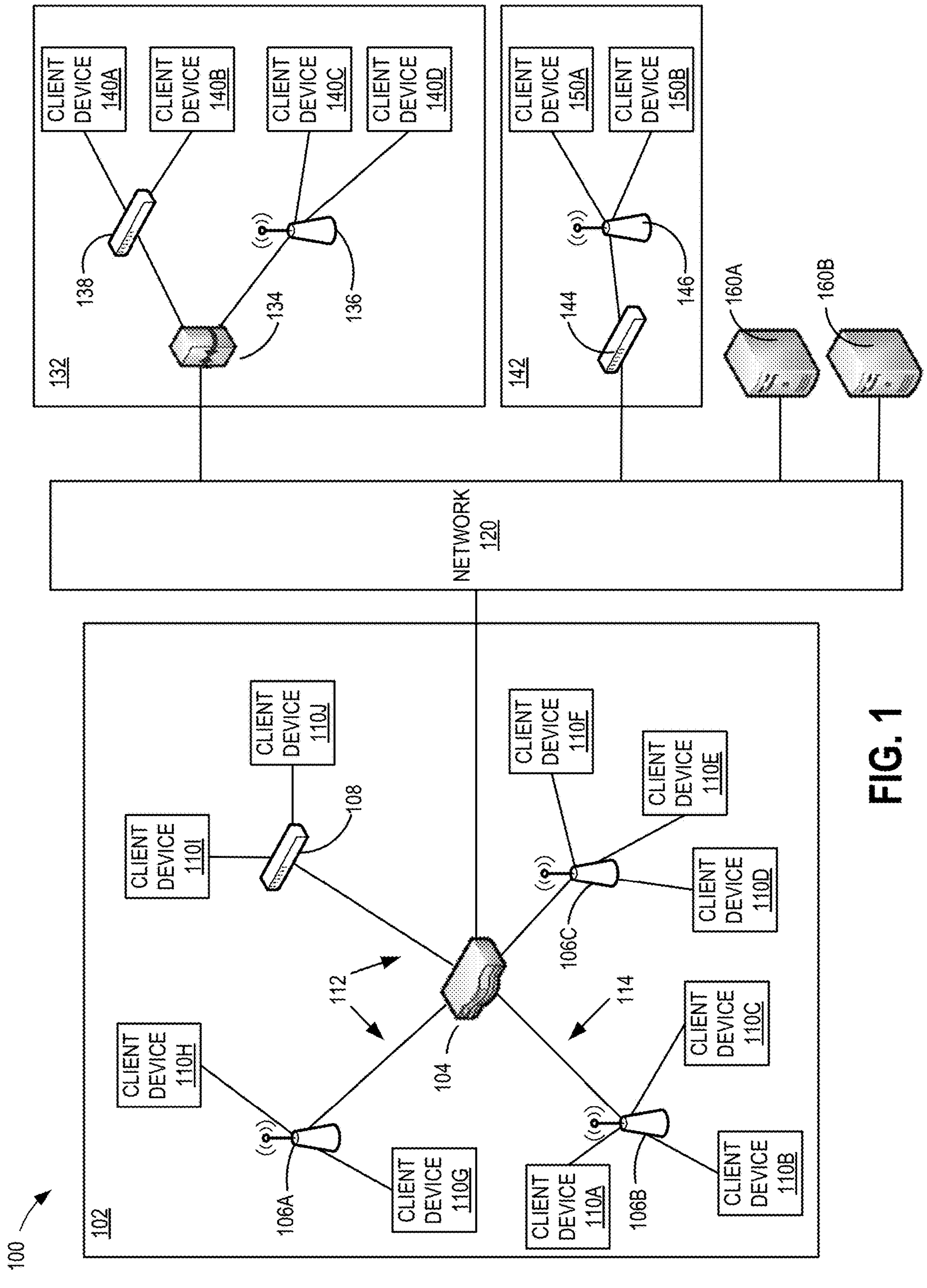
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Implementations disclosed herein achieve dynamic power allocation across a WLAN deployment that can adapt to traffic conditions across the deployment. The disclosed implementations provide a power consumption credits system that be leverage to balance a power budget throughout the WLAN deployment by allocating power consumption credits to high-use network devices (which consume more power), and generating power consumption credits by low-use, low-power consumption network devices. Implementations disclosed herein manage a budget of power consumption throughout the WLAN deployment and allocate power consumption resources throughout the entire WLAN deployment.

Conventionally, in WLAN deployments, network devices in the deployment are powered up to operate at maximum capabilities providing maximum functionality. However, based on location, time of the day and general usage of the network devices, it could be possible that the network devices could operate at reduced capabilities and still meet quality of service requirement and user experience required by the WLAN deployment, and save power in the process. Current approaches to managing power consumption in WLAN deployments focus on power consumption by each network device, with respect to technical aspects (e.g., designs and hardware that consume reduced power, even while with all capabilities enabled), but not on management of capabilities and metrics of power budget across the WLAN deployment.

For example, an access point (AP) may be one type of network device. APs comprise a plurality of wireless interfaces, each of which consists of a transmitter, receiver, and antenna that can be referred to as a radio chain. Conventionally, when an AP is deployed on in a WLAN it operates at its maximum capability, which can include activating each of the wireless interfaces along with activating other capabilities to provide full functionality. Each of the wireless interfaces and other capabilities consume power while activated. However, under certain conditions it may be feasible to operate the AP at reduced capabilities, while still retaining the ability to satisfy the quality of service requirement(s) and user experience specified by the WLAN. For example, if a particular AP is not experiencing high usage (e.g., low traffic), deactivating high-throughput wireless interfaces may be possible to reduce power consumption while maintaining quality of service requirement and user experience required for the low traffic.

Implementations of the present disclosure provide an energy credit system that uses a power budget for a WLAN deployment to define a pool of power consumption credits, which can be utilized to allocate resources across network devices of the WLAN deployment. The power budget, in some implementations, may be specified by a network operator. The pool contains a number of power consumption credits, based on the power budget, which the deployment can use to allocate power consumption across network devices. For example, power consumption credits can be assigned to network devices to permit increased power consumption through increased capabilities, or power consumption credits can be generated and added to the pool based on network devices operating in low power consuming states with fewer capabilities activated. The disclosed technology enables the deployment to save on total power consumed and efficiently distribute power according to the power budget across the entire deployment, without compromising on services and functionality offered to end-user.

The disclosed technology includes an initialization phase and a run phase. The initialization phase includes determining a minimum power consumption and a maximum power consumption of the deployment. The minimum power consumption may be a configuration of the deployment in which all network devices operate at lowest power consumption settings. The maximum power consumption may be configuration of the deployment in which all network devices operate at maximum power consumption settings. A network operator may select an power consumption value between the minimum and maximum power consumption, which can be set as the power budget for the deployment. The disclosed system maps a number of power consumption credits, determined according to the power budget, to a credit pool associated with the deployment.

During the run phase, network devices of the deployment are initiated in a default mode (also referred to as a baseline mode). The default mode for the network devices may be, for example, a minimum energy consuming state according to which each network device operates in order to provide the quality of service and experience required by the WLAN deployment. The data traffic load of each network device is measured periodically. If the load on a network device requires that network device to operate at higher capabilities and consume more energy than the default mode, then one or more power consumption credits from the pool can be allocated to the device, which permits the network device consume more energy to meet the increase in load and provide for the service/capability demands. If a network device can consume less energy than the default mode by operating at reduced capabilities and meet the load, then one or more power consumption credits can be generated based on an amount of energy saved and added to the credit pool. The amount of energy saved may be a difference between energy consumed in the default mode and energy consumed while operating at reduced capabilities. If there are no power consumption credits available, the deployment may operate in the default mode, until power consumption credits are generated and/or the credit pool is re-initialized.

As used herein, a power consumption credit may correspond to a wattage according to the desired implementation. For example, a wattage (e.g., joules per second) to be consumed by a network device may be translated to a power consumption credit at a one to one basis (e.g., 1 W=1 credit). Thus, for each watt a network device requires to operate above default mode can be converted to a power consumption credit to be taken from the pool. While, each watt saved by a network device operating below default mode can be converted to a credit added to the pool. Other implementations are possible, such as one credit may correspond to 2 W, 3 W, 4 W, etc. or 1 W may correspond to one credit, two credits, three credits, etc. The number of credits translated from a number of watts may be dependent on the desired application. In some implementations, credits can be translated to a monetary amount.

Accordingly, implementation disclosed herein provide for managing of network devices across a WLAN deployment in optimal energy consuming states according to set power budget by on defining a pool of power consumption credits from the power budget and allocating/generating credits for network devices based on operating conditions. Additionally, implementations disclosed herein provide for controlling the operation of each network device using the credit pool by allocating power consumption credits to enable network device operation to meet data traffic load demands and provide services/quality of service for the WLAN deployment.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Before describing examples of the disclosed systems and methods in detail, it is useful to describe an example network installation (also referred to as a deployment) with which the disclosed systems and methods might be implemented in various applications. FIG. 1 illustrates an example of a network configuration 100 that may be implemented for an organization, such as a business, educational institution, governmental entity, healthcare facility or other organization. The organization of the network configuration 100 may include multiple users (or at least multiple client devices 110) and possibly multiple physical or geographical sites, such as primary site 102, remote site 132, and remote site 142. The network configuration 100 may include a primary site 102 in communication with a network 120. The network configuration 100 may also include one or more remote sites 132, 142, that are in communication with the network 120.

The network 120 may allow each geographical site of the network configuration 100 of an organization to communicate with one another.

The primary site 102 may include a primary network, which can be, for example, an office network, home network or other network installation. The network of the primary site 102 may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though the controller 104 may not be the only point of communication with the network 120 for the primary site 102. A single controller 104 is illustrated, though the primary site 102 may include multiple controllers and/or multiple communication points with network 120. In some examples, the controller 104 communicates with the network 120 through a router (not illustrated). In other examples, the controller 104 provides router functionality to the devices, such as client devices 110, in the primary site 102.

A controller 104 may be operable to configure and manage network devices, such as at the primary site 102, and may also manage network devices, such as gateway device 134, Access Points (AP) 136, switch 138, gateway device 144 and AP 146, at the remote sites 132, 142. The controller 104 may be operable to configure and/or manage switches, routers, access points, and/or client devices connected to a network. The controller 104 may itself be, or provide the functionality of, an Access Point (AP).

The controller 104 may be in communication with one or more switches 108 and/or wireless APs 106A-C. Switches 108 and wireless APs 106A-C may provide network connectivity to various client devices 110A-J. Using a connection to a switch 108 or AP 106A-C, a client device of client devices 110A-J may access network resources, including other devices on the network of primary site 102 and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client vendors may connect to the network of the primary site 102, the network of the remote site 132, and/or the network of the remote site 142 an organization using client devices, such as client devices 110A-J, client devices 140A-D, and/or client devices 150A-B.

Within the primary site 102, a switch 108 is included as one example of a point of access to the network established in primary site 102 for wired client devices 110I-J. Client devices 110I and 110J may connect to the switch 108 and through the switch 108, may be able to access other devices within the network configuration 100. The client devices 110I and 110J may also be able to access the network 120, through the switch 108. The client devices 110I and 110J may communicate with the switch 108 over a wired 112 connection. In the illustrated example, the switch 108 communicates with the controller 104 over a wired 112 connection, though this connection may also be wireless.

Wireless APs 106A-C are included as another example of a point of access to the network established in primary site 102 for client devices 110A-H. Each of APs 106A-C may be a combination of hardware, software, and/or firmware that is configured to provide wireless network connectivity to wireless client devices 110A-H. In the illustrated example, APs 106A-C can be managed and configured by the controller 104. APs 106A-C may communicate with the controller 104 and the network of primary site 102 over connections 112, which may be either wired or wireless interfaces.

The network configuration 100 may include one or more remote sites, such as remote site 132. Remote site 132 may be located in a different physical or geographical location from the primary site 102. In some cases, the remote site 132 may be in the same geographical location, or possibly the same building, as the primary site 102, but lacks a direct connection to the network of the primary site 102. Instead, remote site 132 may utilize a connection over a different network, e.g., network 120, to connect to the network of the primary site 102. The remote site 132 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 may provide connectivity to the network for various client devices 140A-D.

In various examples, the remote site 132 may be in direct communication with the primary site 102, such that client devices 140A-D at the remote site 132 access the network resources at the primary site 102 as if clients devices 140A-D were located at the primary site 102. In such examples, the remote site 132 may be managed by the controller 104 at the primary site 102, and the controller 104 may provide the necessary connectivity, security, and accessibility that enables the communication of the remote site 132 with the primary site 102. Once connected to the primary site 102, the remote site 132 may function as a part of a private network provided by the primary site 102.

In various examples, the network configuration 100 may include one or more smaller remote sites, such as remote site 142, comprising only a gateway device 144 for communicating with the network 120 and a wireless AP 146, by which various client devices 150A-B may access the network 120. Such a remote site 142 may represent, for example, an individual employee's home or a temporary remote office. The remote site 142 may also be in communication with the primary site 102, such that the client devices 150A-B at remote site 142 access network resources at the primary site 102 as if these client devices 150A-B were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 132 and 142 as well as access to servers, such as servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers such as servers 160A-B. Content servers 160A-B may include various providers of multimedia downloadable and/or streaming content, including audio, video, graphical, and/or text content, or any combination thereof. Examples of content servers 160A-B may include, for example, web servers, streaming radio and video providers, and cable and satellite television providers. The client devices 110A-J, 140A-D, 150A-B may request and access the multimedia content provided by the content servers 160A-B through the network 120.

Although ten client devices 110A-J are illustrated at primary site 102 in the example of FIG. 1, in various applications, a network may include a lesser or greater quantity of client devices. Indeed, some implementations may include a dramatically larger quantities of client devices. For example, various wireless networks may include hundreds, thousands, or even tens of thousands of client communicating with their respective APs, potentially at the same time.

Returning to the implementations of the present disclosure, network devices, such as those described above in connection with FIG. 1, can be operated with reduced capabilities, which can provide reduced power consumption per network device. Generally, a network deployment, such as that of FIG. 1, operates all network devices at peak performance levels offering a full set of capabilities, which increase power consumption across the deployment. The implementations disclosed herein provide for a credit system that uses a power budget for a network deployment to define a pool of power consumption credits. The power consumption credits of the pool can be consumed or accumulated by network devices on the network deployment based on power consumption for operating relative to a baseline (or default) consumption. The pool of power consumption credits can be utilized by a deployment to control network device operation and manage power consumption of across the network deployment. For example, some network devices may be operated at full capability set, while others can be operated at reduced capability set (e.g., operating with one or more capabilities less than the full capability set). Further still, some network devices may be operated in low power mode or switched off. The pool of power consumption credits can thus enable the network deployment to efficiently manage total power consummated by the network deployment and distribute power as needed to network devices according to the power budget across, without compromising on services and functionality offered to end-users (e.g., client devices operated by end-users).

Network devices may have any number of capabilities that can be individually controlled to provide a reduced capability set. For example, the below listed system configurations and parameters may be adjusted to operate in a reduced performance mode, thereby providing reduced power consumption. Example system configurations and parameters include, but are not limited to, link layer discovery protocol (LLDP), which can be disabled globally (e.g., deployment wide) or on a per interface basis (e.g., leaving LLDP enabled on access ports where it may be used for PoE or VoIP applications, but disabling it on infrastructure links or connections to untrusted networks); ethernet links; CPU; DDR clocking; network accelerators; hybrid power requirements (e.g., low power mode in cloud-based infrastructures by reducing a number of cloud server usage, which reduces power consumed); and so on. Adjusting of CPU, DDR clocking, and/or network accelerators may be used to reduce CPU cycles and consume lower power.

Below is listed AP specific configurations and parameters that may be adjusted to operate in a reduced performance mode, thereby providing reduced power consumption. Example AP configurations and parameters includes, but are not limited to, a number of radio chains (e.g., wireless interfaces) that are operating; beacon interval; transmit power; Modulation Coding Scheme (MCS) rate limiting; forced operation in packet switching mode; and so on. An AP may comprise plurality of wireless interfaces (e.g., WiMAX, 3G, 4G, 5G, IEEE 802.11 wireless interfaces, etc.) each of which consists of a transmitter, receiver, and antenna collectively referred to as a radio chain. The number of radio chains that are active may be adjusted to adjust power consumption (e.g., fewer active chains translates to less power consumed). In the case of lower data traffic, lower throughput may be acceptable and certain radio chains may be deactivated to achieve the throughput. Data rate of MCS may also be limited to reduced data rates, which requires less power to effectuate.

In some implementations, in addition to the above configurations and parameters, client device configurations and parameters may also be adjusted to achieve lower power consumption on a network wide basis. For example, client devices can be forced to operate in power saving mode, limit bandwidth usage, limit usage of certain device applications (e.g., high data consuming applications such as video), and so on. By reducing performance on a client device side, data traffic load on an AP and/or switch may be reduced, which can translate to reduced power consumption across the network deployment.

Figure 2:
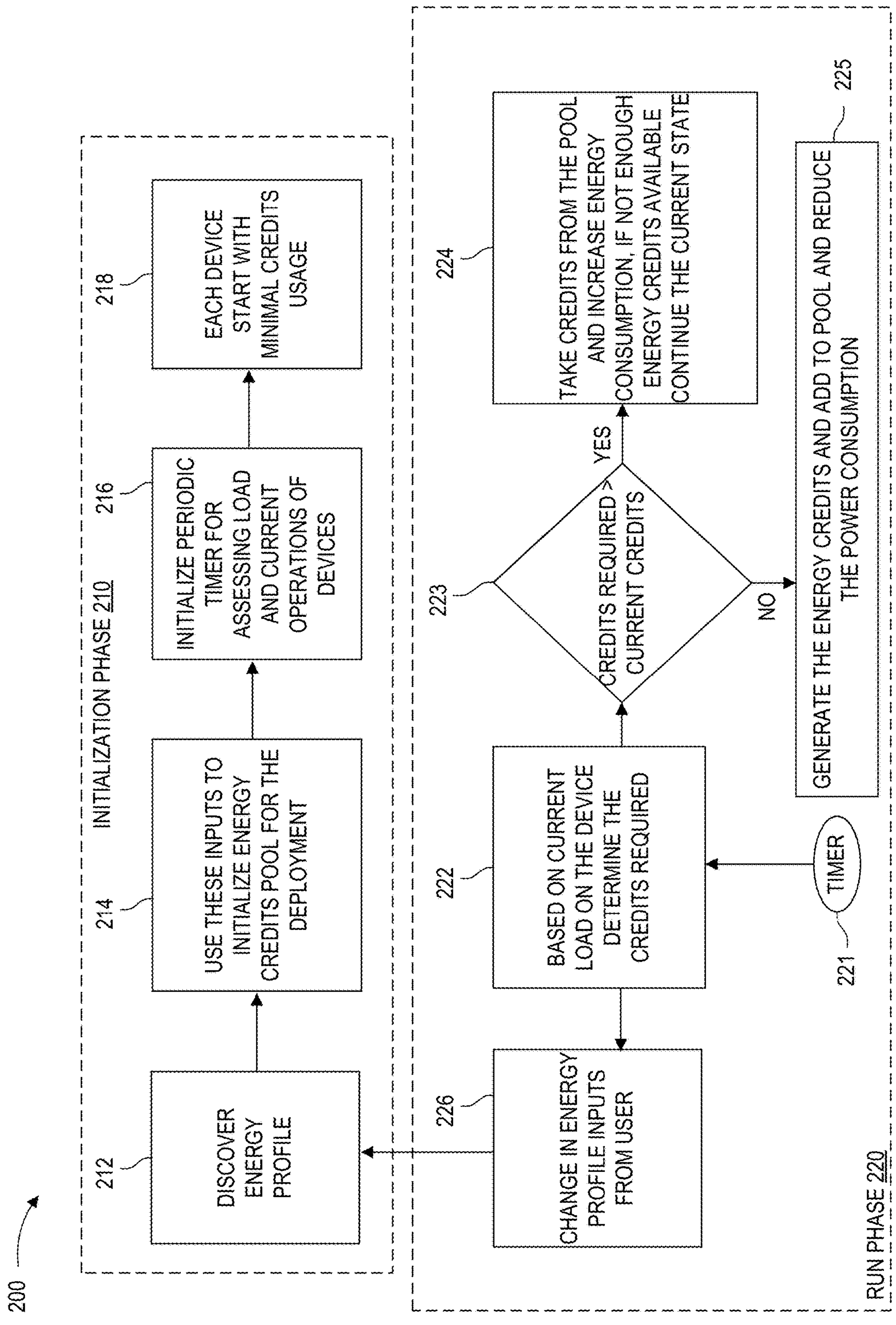
FIG. 2 is a flow diagram of a process for managing network power consumption using a power consumption credit system in accordance with implementations disclosed herein.

FIG. 2 is a flow diagram of process 200 for managing network power consumption using a power consumption credit system in accordance with implementations disclosed herein. Process 200 may be implemented as instructions, for example, stored in a memory, that when executed by one or more processors perform one or more operations of process 200. The process 200 will be described below with reference to FIG. 1 as an illustrative examples. For example, process 200 may be executed by controller 104. However, one skilled in the art will appreciate that the embodiments disclosed herein are not to be limited to this implementation only. For example, process 200 may be implemented as instructions stored in a cloud-based architecture and executed by a cloud-based server, which issues instructions to controller 104.

Process 200 comprises two phases, an initialization phase 210 and a run phase 220. During the initialization phase 210, a number of power consumption credits can be mapped to a pool associated with the network deployment. During the run phase 220, power consumption credits can be consumed or accumulated by network devices of the deployment based on power consumption needed to operate according to a current data traffic load on the network device relative to a baseline consumption. Capabilities and functionality of the network devices can be controlled during run phase 220 according to number of power consumption credits remaining in the pool.

During the initialization phase 210, an power profile of the network deployment can be discovered at operation 212. For example, controller 104 can discover power profiles of network devices on the network configuration 100. Network devices according to implementations disclosed herein can include any of the network devices described in accordance with FIG. 1. For example, AP 106A-C and switch 108 may be example network devices. Additionally, in some examples, switch 138, AP 136, gateway device 144, and AP 146 may be example network devices. Further, in some examples, controller 104 may be a network device, as well as servers 160A and 160B.

At operation 212, a minimum power consumption and a maximum power consumption of the network deployment can be determined. For example, the minimum power consumption can be determined by measuring power consumed across the network while all network devices of the deployment are operated in lowest power consumption configurations, while still providing services and functionality to client devices (e.g., lowest capability set possible that maintains required services and functionality). The minimum power consumption parameter may represent a minimum energy requirement for the network deployment to provide services and functionality over a period of time (e.g., number of joules consumed over a period of time in seconds). The maximum power consumption can be determined by measuring power consumed across the network with all network devices operated in highest power consumption configurations (e.g., full capability set operating). This may represent a maximum energy requirement for the network deployment. The minimum power consumption and the maximum power consumption can be provided as a wattage. In an illustrative example, a maximum power consumption may be 25 W and a minimum power consumption may be 7 W.

Operation 212 may also include setting a power budget for the network deployment. In some implementations, a network operator may select a power budget for the deployment according to desired power consumption for the deployment. For example, energy costs incurred by the network operator may be considered in selecting a power budget. A trade off in power allocated and energy or power costs may be balanced in selecting a power budget that meets the network operators goals. In various implementations, the power budget can be selected at a value residing between the minimum power consumption and the maximum power consumption, thereby providing services and functionality to client devices while balancing the power related costs. In some implementations, artificial intelligence (AI) and machine learning (ML) algorithms may be used to set a power budget according to conditions on the network. For example, AI and ML algorithms may be trained to recognize patterns in data traffic on the deployment and conditions, such as time of day, day of the week, schedules, etc. The AI and ML algorithms can then act to set a power budget between the minimum and maximum power consumptions based on the recognized patterns correlated with conditions.

At operation 214, a pool of power consumption credits can be initialized for the network deployment based on a set power budget for the network deployment. A credit pool can be initialized and associated with a specific deployment. That is, each distinct network deployment (which may correspond to different customers or the same customer in some cases) may be associated with a credit pool. For example, an area of memory in controller 104 (or in a cloud-base database) can be designated as a pool for holding power consumption credits. Based on the set power budget, a number of power consumption credits can be mapped to the pool. The number of power consumption credits may depend on the power budget, such that a larger power budget results in a larger number of credits compared to a smaller power budget. In an illustrative example, a power budget may include a wattage power that the deployment is budgeted to consume and each watt of power may be translated to a power consumption credit, such that the number of power consumption credits equals the budgeted wattage. This is merely an example, and other implementations are possible based on a desired application (e.g., two credits to each watt, three credits, etc. or two watts to each credit, three watts, etc.). Furthermore, power consumption credits may be mapped to larger or smaller granularity in wattage (e.g., milliwatts, kilowatts, etc.). As will be described below in more detail, the power consumption credits in the pool may be utilized by the network devices to define an amount of power that may be consumed by the deployment, which can be translated to enabling/disabling capabilities of network devices according to the consumable power available in the pool.

At operation 216, a timer can be initialized. The timer may be used for triggering data traffic load assessments of current operating configurations of network devices. The timer may be periodic or aperiodic. A periodic timer may have a period in seconds, bi-daily, tri-daily, daily, bi-weekly, weekly, bi-months, monthly, or any desired period. The timer may be reconfigurable based on location, expected data traffic peaks or valleys, etc. For example, the timer may be configured to be daily (or every coupled days, few days, etc.) when data traffic is expected to be low and then reinitialized to be bi-daily, hourly, on the minute, on the second, etc., when data traffic is expected to be high. For example, in the case of a stadium, data traffic may be expected to be high when an event is occurring, and the timer may be set to higher frequency than when an event is not occurring. In some implementations, the timer by assisted by artificial intelligence (AI) and machine learning (ML) algorithms. For example, AI and ML algorithms may be trained to recognize patterns in data traffic on the deployment and initialize timers accordingly. For example, data during run phase 220 may be collected and used to train a model to recognize features indicative of increased data traffic at a time of day, area, etc. The model may then act to reinitialize the timer responsive to detecting the feature. The model may be stored at controller 104 and/or a cloud-based database and executed on a cloud-based server.

At operation 218, each network device of the deployment can be assigned a default number of power consumption credits from the pool. In an illustrative example, the default number of power consumption credits may be a number of credits corresponding to baseline power consumption by each respective network device so to permit power consumption required to enable minimum capabilities so to provide services and functionality to client devices. For example, the baseline power consumption may be the same as the configuration used to obtain the minimum power consumption parameter in operation 212. In an example, assigning power consumption credits to each respective network device may be achieved by mapping a number of power consumption credits to each respective network device in data table that lists each network device and associated number of power consumption credits mapped thereto. The default number of power consumption credits will be available to each network device upon startup of the network device. Network devices may be activated (e.g., startup) when the entire deployment is initialized and/or when a new network device is introduced to the deployment.

Upon startup process 200 transitions to the run phase 220. During run phase 220, the timer 221 is incremented, which may be time initialized at operation 216. The timer 221 triggers operation 222, for example, at each period of the timer int eh case of a periodic time. Operation 222 determines a current power consumption credit usage of each network device based on a current data traffic load on each network device. For example, at operation 222 measures a current data traffic load on each network device responsive to triggering by the timer 221. The current data traffic load can be converted to a capability set of each network device that is required to satisfy the data traffic load, and the capability set can be translated to a power consumption requirement for enabling the capability set. That is, an amount of power needed by the network device to activate each capability of the capability set. The power consumption may be dependent upon the specific capabilities to be activated, which may be dependent upon the data traffic load and capabilities available to that each network device. The power consumption requirement can be converted to a current power consumption credit requirement for each network device (e.g., one watt of power to one credit in an example implementation).

Referring to a single network device, a current power consumption credit requirement can be compared to the number of power consumption credits assigned to the network device at operation 223. If the current power consumption credit requirement is greater than the number of power consumption credits assigned to the network device, process 200 proceeds to operation 224 where one or more power consumption credits are taken from the pool and assigned to the network device. The number of power consumption credits assigned to the network device may correspond to a difference between the current power consumption credit requirement and the assigned power consumption credits (e.g., the number of power consumption credits required minus the number assigned). Assigning more power consumption credits to the network device enables the network device to consume increased amounts of power according to the number of power consumption credits assigned and thus enables increased capabilities to handle the data traffic load measured at operation 222. Operation 222 may be performed on each network device on the network deployment. Each instance of operation 222 for each network device may be performed in parallel, sequentially, or in any order desired for a given application.

Assigning one or more credits to a network device means power consumption credits are consumed from the pool. This reduces the number of power consumption credits available in the pool, and thus available to other network devices. If there are no credits available in the pool (e.g., all credits assigned to a network device), then the network device operates at a configuration without increased capabilities. In some implementations, if the number of available power consumption credits is less than the number of power consumption credits required, the network device may consume the available power consumption credits, thereby increasing power consumption and capabilities. Yet, this increased capabilities may be not all capabilities required to satisfy the measured data traffic load.

If the current power consumption credit requirement is equal to or less than the number of power consumption credits assigned to the network device, process 200 proceeds to operation 224. If the current power consumption credit requirement is equal to the number of assigned power consumption credits, then the network device may continue with its current capability configuration and power consumption. However, if the current power consumption credit requirement is less than the number of assigned power consumption credits, then the network device may generate one or more power consumption credits and add the power consumption credits to the pool, at operation 225. Additionally, the network device can be controlled (e.g., by controller 104) to reduce power consumption by disabling one or more capabilities of the network device. For example, a subset of a current set of capabilities for a network device can be disabled to provide a reduced power consumption configuration. In another example, the network device may enter sleep mode and/or be deactivated where current power consumption credit usage indicates that functionality is not needed. The number of power consumption credits generated may correspond to an amount of power saved by configuring the network device to a reduced consumption configuration (or sleep mode or turned off). For example, the number of power consumption credits required may be subtracted from the current number of power consumption credits assigned to the network device, and the difference added to the pool. Thus, the amount of power saved in reduced power consumption configuration may be added to the pool for consumption by another network device that needs such power. Operation 225 may be performed on each network device on the network deployment. Each instance of operation 225 for each network device may be performed in parallel, sequentially, or in any order desired for a given application.

At operation 226, the power budget utilized in the initialization phase 210 may be changed and used to re-initialize the pool of power consumption credits. For example, a network operator may input a updated power budget value at operation 226 to adjust power consumption on the network deployment. In another example, the pool may be reinitialized based on preset conditions, such as time of day, day of the week, schedules, etc. For example, the pool may be initialized for working hours in a day, when power consumption is expected to be large, so to set a power budget closer to the maximum consumption parameter and map a larger number of power consumption credits to the pool. Then during off-working hours (e.g., at night), the pool may be reutilized so to set the power budge closer to the minimum consumption parameter and map fewer power consumption credits to the pool. In another example, a larger number of power consumption credits may be mapped to the pool during work days as compared to non-working days (e.g., weekend, holidays, etc.).

In some implementations, a pool of power consumption credits may be allocated according to site or geographical region. For example, a pool of power consumption credits may be mapped to primary site 102, while another pool mapped to remote site 132. The number of power consumption credits mapped to each pool may be a function of conditions, such as those above. For example, in the case of a college campus, primary site 102 may be classrooms, laborites, offices, etc. and remote site 132 may be dormitories. In this case, during the day time, the number of power consumption credits mapped to primary site 102 may be larger than that mapped to remote site 132 to ensure services and functionality are minted in primary site 102. At night, a number of power consumption credits mapped to remote site 132 may be reinitialized and increased to address a shift in client devices loading remote site 132.

In some implementations, operation 226 may be executed based on AI and ML algorithms trained to recognize patterns in client device traffic on the deployment and set power budgets accordingly. For example, data during run phase 220 may be collected and used to train a model to recognize features indicative of increased data traffic at a time of day, area, etc. and act to reinitialize the pool response to detecting the increased data traffic. The model may be stored at controller 104 and/or a cloud-based database and executed on a cloud-based server.

As alluded to above, power consumption credits can be shared across sites operated by a common network operator. For example, primary site 102, remote site 132 and remote site 142 may represent separate branches, each of which may be assigned a distinct pool. Power consumption credits may be mapped to each pool as described above. However, power consumption credits maybe mapped between the branches based on power consumption needs and a function of conditions. For example, referring to the college campus example described above, power consumption credits mapped to primary site 102 may be shared (e.g., mapped) to remote site 132 as needed. For example, an increase in data traffic at remote site 132 may cause power consumption credits mapped to primary site 102 to be mapped to remote site 132.

Process 200 is not intended to be limited to the particular sequence shown in FIG. 2, and the blocks or operation relating thereto can be performed in other sequences that are appropriate, or may be performed in parallel, or in some other manner. For example, operations 214-218 may be executed in any order or in parallel, not only the explicit order illustrated in FIG. 2. Similarly, operations 223-225 may be executed in any order or in parallel. Other configurations are possible as well.

Figure 3:
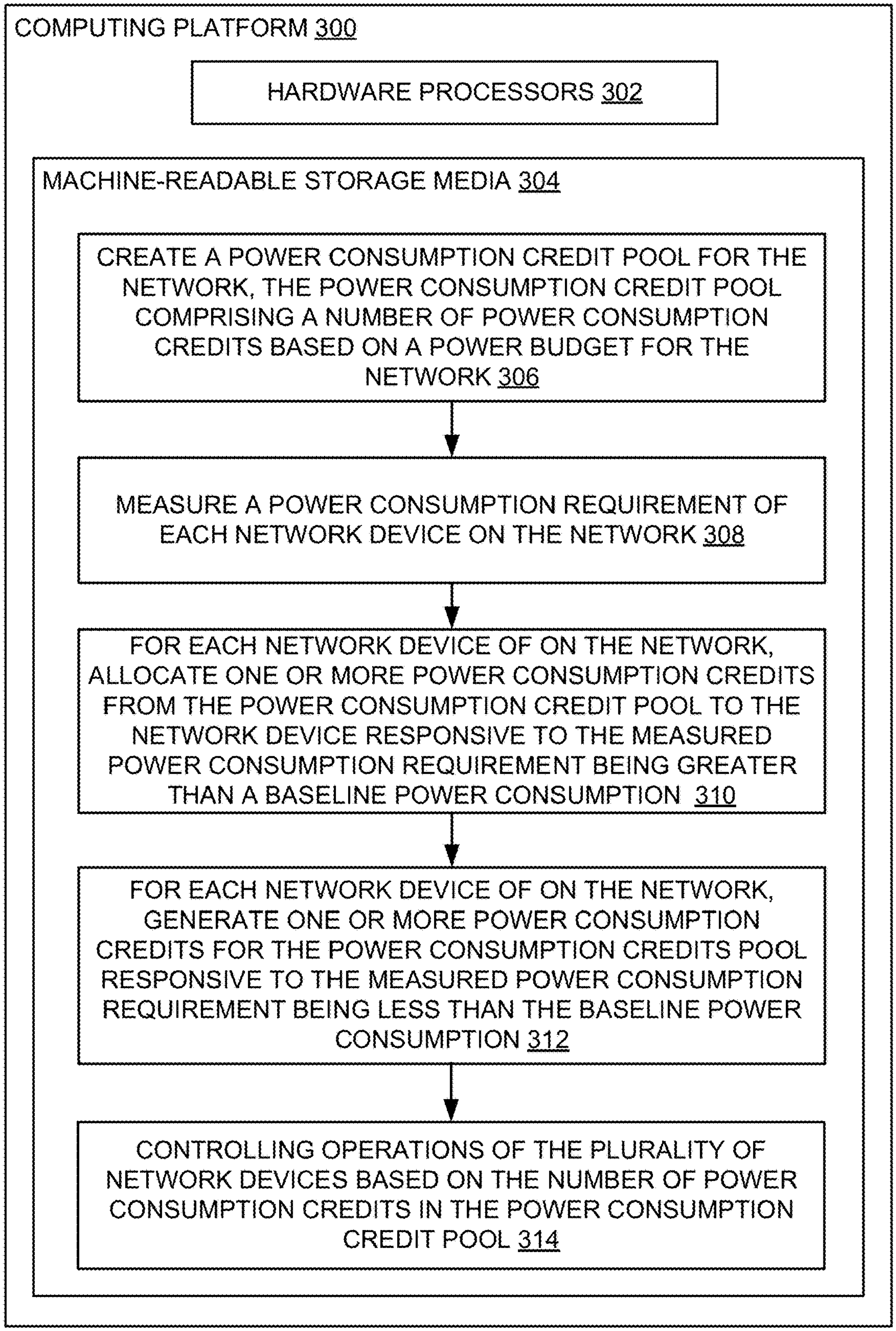
FIG. 3 is an example computing component that may be used to implement various features of allocating power consumption across a network deployment in accordance with the implementations disclosed herein.

FIG. 3 illustrates an example computing component that may be used to implement allocation of power consumption across a network deployment in accordance with various implementations disclosed herein. Referring now to FIG. 3, computing component 300 may be, for example, a server computer, a controller, or any other similar computing component capable of processing data. In the example implementation of FIG. 3, the computing component 300 includes a hardware processor 302, and machine-readable storage medium for 304.

Hardware processor 302 may be one or more central processing units (CPUs), semiconductor-based microprocessors, and/or other hardware devices suitable for retrieval and execution of instructions stored in machine-readable storage medium 304. Hardware processor 302 may fetch, decode, and execute instructions, such as instructions 306-314, to control processes or operations for allocating power consumption of a network. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EE- PROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-314.

Hardware processor 302 may execute instruction 306 to create a power consumption credit pool for a network. For example, as explained above in FIG. 2, a credit pool can be initialized for a network deployment, such as the installation/deployment of FIG. 1. As explained above, the power consumption credit pool can include a number of power consumption credits based on a power budget for the network.

Hardware processor 302 may execute instruction 308 to measure a power consumption requirement of each network device. For example, as explained above in connection FIG. 2, a current data traffic load for each respective network device can be measured, which can be translated to a power consumption requirement and then converted to power consumption credits.

Hardware processor 302 may execute instruction 310 to, for each network device, allocate one or more power consumption credits from the power consumption credit pool to the network device responsive to the measured power consumption requirement being greater than a baseline power consumption. For example, as explained above in connection with FIG. 2, a baseline power consumption may be converted to a first (or default) number of power consumption credits, which can be assigned to each respective network device. If the power consumption credit requirement is greater than the first number of power consumption credits, one or more power consumption credits can be allocated to each respective network device.

Hardware processor 302 may execute instruction 312 to, for each network device, generate one or more power consumption credits for the power consumption credits pool responsive to the measured power consumption requirement being less than the baseline power consumption. For example, as explained above in connection with FIG. 2, if the power consumption credit requirement is less than the first number of power consumption credits, one or more power consumption credits can be generated based on the power saved by the network device and added to the credit pool.

Hardware processor 302 may execute instruction 314 to control operations of the network devices based on the number of power consumption credits in the power consumption credit pool. For example, as explained above in connection with FIG. 2, network devices may enable or disable one or more capabilities according to the power consumption credits assigned thereto for satisfying measured data traffic loads. In an example implementation, a controller (e.g., controller 104) or a cloud-based server may issue commands to network devices enable/disable capabilities in accordance with the number of assigned power consumption credits.

Figure 4:
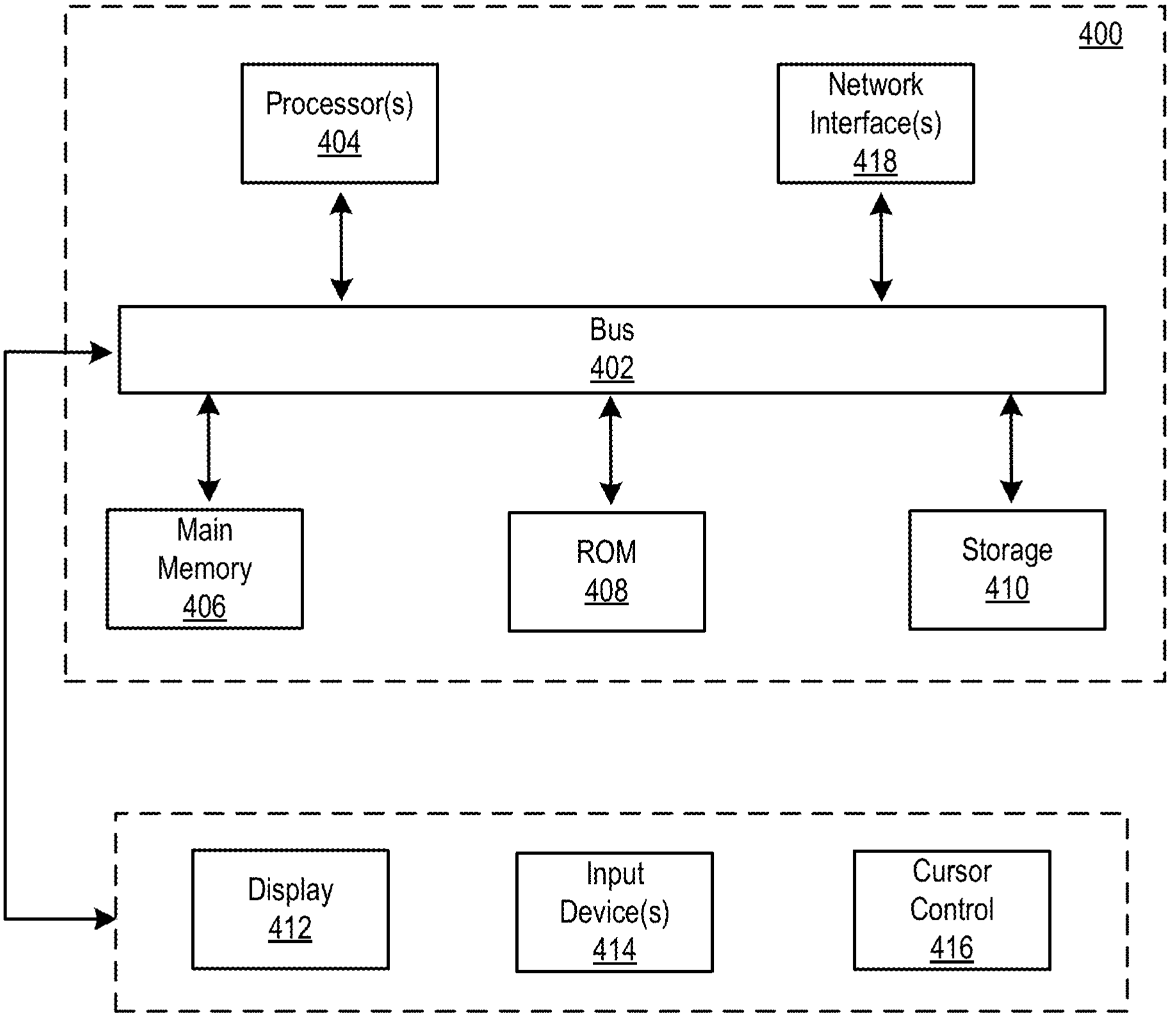
FIG. 4 is an example computer system that may be used to implement various features of allocating power consumption across a network deployment of the present disclosure.

FIG. 4 depicts a block diagram of an example computer system 400 in which various of the embodiments described herein may be implemented. The computer system 400 may be an example implementation of a component of network configuration 100, such as, but not limited to, controller 104; APs 106, 146, and/or 136, client devices 110, 140, and/or 150; switches 108 and/or 138; gateway devices 134 and/or 144; server 160A, server 160B, etc. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicated with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for allocating power consumption of a network, the method comprising:

creating a power consumption credit pool for the network, the power consumption credit pool comprising a number of power consumption credits based on a power budget for the network, the network comprising a plurality of network devices;

for each network device of the plurality of network devices:

measuring a power consumption requirement by:

measuring a current data traffic load of the network device;

translating the current data traffic load to a power consumption requirement based on enabling capabilities of the network device for meeting the data traffic load; and converting the power consumption requirement to a power consumption credit requirement;

responsive to the measured power consumption requirement being greater than a baseline power consumption, allocating one or more power consumption credits from the power consumption credit pool to the network device; and responsive to the measured power consumption requirement being less than the baseline power consumption, generating one or more power consumption credits for the power consumption credits pool;

assigning a first number of power consumption credits to each of the plurality of network devices responsive to activating the plurality of network devices; and controlling operations of the plurality of network devices based on the number of power consumption credits in the power consumption credit pool.

2. The method of claim 1, wherein the power budget is set between a minimum power consumption of the network when all of the plurality of network devices operate at minimum power consumption and a maximum power consumption of the network when all of the plurality of network devices operate at maximum power consumption.

3. The method of claim 1, wherein the baseline power consumption is a minimum power consumption of the network.

4. The method of claim 1, further comprising:

determining that the power consumption credit requirement is greater than the first number of power consumption credits, wherein allocating one or more power consumption credits from the power consumption credit pool to the network device is responsive to the determination.

5. The method of claim 4, further comprising:

controlling the network device to activate one or more capabilities based on the allocated one or more power consumption credits.

6. The method of claim 4, further comprising:

determining that a number of power consumption credits in the power consumption credit pool is less than a difference between the power consumption credit requirement and the first number of power consumption credits; and controlling the network device to operate at current capabilities responsive to the determination.

7. The method of claim 6, further comprising:

controlling the network device to deactivate one or more capabilities based on the determination.

8. The method of claim 1, further comprising:

determining that the power consumption credit requirement is less than the first number of power consumption credits, wherein generating one or more power consumption credits for the power consumption credits pool is responsive to the determination.

9. A controller, comprising:

a memory storing instructions; and one or more processors coupled to the memory and configured to execute the instructions to:

create a power consumption credit pool for a network, the power consumption credit pool comprising a number of power consumption credits based on a power budget for the network, the network comprising a plurality of network devices;

for each network device of the plurality of network devices:

measure a power consumption requirement by:

measuring a current data traffic load of the network device;

translating the current data traffic load to a power consumption requirement based on enabling capabilities of the network device for meeting the data traffic load; and converting the power consumption requirement to a power consumption credit requirement;

responsive to the measured power consumption requirement being greater than a baseline power consumption, allocate one or more power consumption credits from the power consumption credit pool to the network device; and responsive to the measured power consumption requirement being less than the baseline power consumption, generate one or more power consumption credits for the power consumption credits pool;

assign a first number of power consumption credits to each of the plurality of network devices responsive to activating the plurality of network devices; and control operations of the plurality of network devices based on the number of power consumption credits in the power consumption credit pool.

10. The controller of claim 9, wherein the power budget is set between a minimum power consumption of the network when all of the plurality of network devices operate at minimum power consumption and a maximum power consumption of the network when all of the plurality of network devices operate at maximum power consumption.

11. The controller of claim 9, wherein the baseline power consumption is a minimum power consumption of the network.

12. The controller of claim 9, wherein the one or more processors are further configured to:

determine that the power consumption credit requirement is greater than the first number of power consumption credits, wherein allocating one or more power consumption credits from the power consumption credit pool to the network device is responsive to the determination.

13. The controller of claim 12, wherein the one or more processors are further configured to:

control the network device to activate one or more capabilities based on the allocated one or more power consumption credits.

14. The controller of claim 12, wherein the one or more processors are further configured to:

determine that a number of power consumption credits in the power consumption credit pool is less than a difference between the power consumption credit requirement and the first number of power consumption credits; and control the network device to operate at current capabilities responsive to the determination.

15. The controller of claim 9, wherein the one or more processors are further configured to:

determine that the power consumption credit requirement is less than the first number of power consumption credits, wherein generating one or more power consumption credits for the power consumption credits pool is responsive to the determination.

* * * * *